(12) United States Patent
Terashima

(10) Patent No.: US 9,556,934 B2
(45) Date of Patent: Jan. 31, 2017

(54) DUAL CLUTCH TRANSMISSION CONTROL METHOD, DUAL CLUTCH TRANSMISSION, AND VEHICLE MOUNTED THEREWITH

(75) Inventor: Koji Terashima, Fujisawa Kanagawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 492 days.

(21) Appl. No.: 14/130,480

(22) PCT Filed: Jun. 29, 2012

(86) PCT No.: PCT/JP2012/066703
§ 371 (c)(1),
(2), (4) Date: Dec. 31, 2013

(87) PCT Pub. No.: WO2013/005673
PCT Pub. Date: Jan. 10, 2013

(65) Prior Publication Data
US 2014/0150583 A1   Jun. 5, 2014

(30) Foreign Application Priority Data
Jul. 4, 2011   (JP) ................................. 2011-148151

(51) Int. Cl.
*F16H 3/08*  (2006.01)
*F16H 61/688*  (2006.01)
(Continued)

(52) U.S. Cl.
CPC .............. *F16H 3/08* (2013.01); *F16H 61/688* (2013.01); *B60Y 2300/186* (2013.01);
(Continued)

(58) Field of Classification Search
CPC .... F16H 3/08; F16H 61/688; F16H 2061/023; F16H 2312/02
(Continued)

(56) References Cited

U.S. PATENT DOCUMENTS 6,463,821 B1   10/2002   Reed, Jr. et al.
7,416,514 B2 *   8/2008   Dell ........................ F16H 59/70
192/3.63
(Continued)

FOREIGN PATENT DOCUMENTS

DE    100 15 296 A1    8/2001
EP    2256369 A1    12/2010
(Continued)

OTHER PUBLICATIONS

International Search Report dated Aug. 28, 2012 in PCT/JP2012/066703.

*Primary Examiner* — William C Joyce
(74) *Attorney, Agent, or Firm* — Staas & Halsey LLP

(57) ABSTRACT

A method of controlling a dual clutch transmission, a dual clutch transmission, and a vehicle equipped with the same which can reduce the load on a clutch on a start gear side to reduce the wear thereof and therefore make the clutch replacement interval longer. There are a first input shaft to be connected to a first clutch and a second input shaft to be connected to a second clutch. A set of odd-numbered gears and a set of even-numbered gears are arranged respectively across the first input shaft and second input shaft and an output shaft. When a vehicle starts, a start gear and a support gear are synchronously engaged to the second input shaft and the first input shaft, respectively, and simultaneously connecting the first clutch and the second clutch partially (half clutch state) to the first input shaft and the second input shaft, respectively, the support gear having a gear ratio smaller than that of the start gear by one speed or higher.

3 Claims, 6 Drawing Sheets

(51) Int. Cl.
 *F16H 59/72* (2006.01)
 *F16H 61/02* (2006.01)

(52) U.S. Cl.
 CPC .. *F16H 2059/725* (2013.01); *F16H 2061/023* (2013.01); *F16H 2312/02* (2013.01); *Y10T 74/19228* (2015.01)

(58) Field of Classification Search
 USPC .............................................. 74/330; 477/80
 See application file for complete search history.

(56) References Cited

U.S. PATENT DOCUMENTS

| | | | |
|---|---|---|---|
| 9,222,548 | B2 | 12/2015 | Terashima |
| 2002/0189383 | A1* | 12/2002 | Schamscha ......... F16H 61/0059 74/340 |
| 2004/0259680 | A1 | 12/2004 | Ozeki et al. |
| 2006/0122031 | A1* | 6/2006 | Preisner ................ B60W 10/02 477/80 |
| 2007/0191186 | A1 | 8/2007 | Bothe et al. |

FOREIGN PATENT DOCUMENTS

| | | |
|---|---|---|
| JP | 2006-132562 | 5/2006 |
| JP | 2007-170640 | 7/2007 |
| JP | 2007-176430 | 7/2007 |
| JP | 2007-522397 | 8/2007 |
| JP | 2008-309325 | 12/2008 |
| JP | 2011-112174 | 6/2011 |

\* cited by examiner

PRIOR ART

PRIOR ART

US 9,556,934 B2

DUAL CLUTCH TRANSMISSION CONTROL METHOD, DUAL CLUTCH TRANSMISSION, AND VEHICLE MOUNTED THEREWITH

TECHNICAL FIELD

This application claims the benefit under U.S.C. Section 371, of PCT International Application No. PCT/JP2012/066703, filed Jun. 29, 2012 and Japanese Application No. 2011-148151 filed Jul. 4, 2011, the contents of which are incorporated herein by reference.

The present invention relates to a method of controlling a dual clutch transmission, a dual clutch transmission, and a vehicle equipped with the same which reduce the load on both clutches and reduce the wear thereof to thereby improve the durability thereof, the dual clutch transmission including at least two input shafts and two clutches to smooth gear shift operations.

BACKGROUND ART

Heretofore, a dual clutch transmission (hereinafter, referred to as the DCT) including two clutch systems has been developed for improvement in the gear shift time of an automated manual transmission (hereinafter, referred to as the AMT). The DCT generally includes a clutch for each of an even-numbered gear set and an odd-numbered gear set and shifts by switching the clutches. For this reason, a gear shift operation of an odd-numbered gear (or an even-numbered gear) can be performed while an even-numbered gear (or an odd-numbered gear) is being used. This DCT allows a quick gear shift with no gear shift time lag. Moreover, since the DCT transmits power by clutches, it has a simple structure and the power loss is small, or the transmission efficiency is good, which leads to improvement in fuel consumption.

Here, the conventional DCT will be described with reference to FIGS. 5 and 6. As shown in FIG. 5, a DCT 1X includes a first input shaft 11, a second input shaft 12, a first clutch C1, a second clutch C2, a countershaft 13, gears G1 to G6, a gear GR, coupling sleeves S1 to S3, and a coupling sleeve SR.

The power of an engine (internal combustion engine) is received from a crankshaft 2 through the first clutch C1 or the second clutch C2, and that power is transmitted to an output shaft 3 after its speed is changed at one of the gears.

The second input shaft 12 is formed in a hollow shape, and the first input shaft 11 is coaxially inserted in the second input shaft 12. The gears G1, G3, G5, and GR are arranged on the first input shaft 11, and the gears G2, G4, and G6 are arranged on the second input shaft. The power can be transmitted by connecting the first clutch C1 to the first input shaft 11 or the second clutch C2 to the second input shaft, and synchronously engaging one of the coupling sleeves S1 to SR provided on the countershaft 13 to one of the gears G1 to GR.

The clutch C1 includes a flywheel C1a, a clutch cover C1b, a release bearing C1c, a diaphragm spring C1d, a pressure plate C1e, and a clutch disk C1f formed of a lining, a torsion damper, a thrust, and the like. The clutch C2 has a similar configuration as well.

As shown in FIG. 6, the DCT 1X described above further includes an ECU (control device) 20, a clutch operation mechanism 21 which operates the clutch C1 or the clutch C2, and a shift operation mechanism 22 which operates the coupling sleeves S1 to SR. Hydraulic pistons or the like can be used for the clutch operation mechanism 21 and the shift operation mechanism 22.

Next, the operation of this DCT 1X during start will be described. This DCT 1X uses the gear G1 as a start gear DG1. When the vehicle stops travelling and the engine stops, the ECU 20 disconnects the first clutch C1 and the second clutch C2 and synchronously engages the coupling sleeve S1 to the start gear DG1. When the vehicle starts, the ECU 20 connects the first clutch C1 to the first input shaft 11. Arrows in FIG. 6 illustrate the transmission of power during this state.

Then, the ECU 20 synchronously engages the coupling sleeve S2 to the gear G2 so that smooth acceleration will be performed. In this way, in the case of a shift from the start gear DG1 to the gear G2, the first clutch C1 and the first input shaft are disconnected from each other (hereinafter, expressed as being fully disconnected), and the second clutch C2 is connected to the second input shaft 12 (hereinafter, expressed as being fully connected). Since the connection can be switched back and forth as described above, gear shift operations can be done smoothly.

Here, as described above, the DCT normally uses a predetermined gear such as the first gear or the second gear for start. Thus, the clutch to be used for start is either the one for the odd-numbered gears or the one for the even-numbered gears. Such a clutch is subjected to high load when brought into a connected state during start and wears accordingly. Thus, one of the clutches, the one for the odd-number gears or the one for the even-numbered gears, wears faster.

A clutch of a sufficiently large volume may be used to prevent this clutch wear. It is, however, difficult to secure a sufficiently large volume in the case of a DCT with two clutches housed in a small space. Meanwhile, as measures against this wear, there are devices employing a method that involves switching the start gear based on the worn states of the clutches, a start condition, etc. (see Patent Document 1 and Patent Document 2, for example). These devices can make the wear of the clutches even by selecting the appropriate start gear based on the worn states of the clutches. This, however, leads to a problem of changing the feel during start, which impairs the driving comfort of the vehicle.

PRIOR ART DOCUMENTS

Patent Document 1: Japanese patent application Kokai publication No. 2006-132562

Patent Document 2: Japanese patent application Kokai publication No. 2008-309325

SUMMARY OF THE INVENTION

The present invention has been made in view of the above problem, and an object thereof is to provide a method of controlling a dual clutch transmission, a dual clutch transmission, and a vehicle equipped with the same which can reduce the load on one of clutches to suppress the occurrence of wear of only the one clutch and therefore make the clutch replacement interval longer, without requiring any additional component and also without changing the feel during start.

A method of controlling a dual clutch transmission for achieving the above-described object is a method of controlling a dual clutch transmission which includes at least a first input shaft configured to be connected to a first clutch and a second input shaft configured to be connected to a second clutch, and in which a set of odd-numbered gears and a set of even-numbered gears are arranged every one step for alternation respectively between the first and the second input shafts and an output shaft, and in a case of starting transmission of power from a power source to the output shaft, the transmission of the power is started by synchronously engaging a start gear being one of the gears for start to the second input shaft and connecting the second clutch to the second input shaft, and including, at the time of starting the transmission of the power from the power source to the output shaft, synchronously engaging the start gear to the second input shaft and a support gear to the first input shaft, respectively, and simultaneously connecting the first clutch partially to the first input shaft and the second clutch partially to the second input shaft, respectively, the support gear having a gear ratio smaller than that of the start gear by one speed or higher.

According to this method, at the moment when a vehicle starts, both clutches are used to transmit the torque through both clutches, thereby making it possible to reduce the wear of the clutch on the start gear side. Thus, the clutch replacement interval can be made longer. Meanwhile, with the start gear and the support gear differing from each other in gear ratio, fully connecting both clutches linked to these gears may result in double engagement and stop the operation or result in slip of one of the clutches. However, the clutches linked to the gears are in a half clutch state, or partially connected, hence absorbing the rotational speed difference. Thus, the double engagement will never occur. Since this method requires a support gear having a gear ratio smaller than that of the start gear by one speed or higher, the start gear is set to be the second or higher gear. For example, the start gear is set to be the second gear, and the support gear is set to be the first gear.

Moreover, the above-described method of controlling a dual clutch transmission further includes: disconnecting the first clutch from the first input shaft, when a difference between a rotational speed inputted to the first clutch and a rotational speed outputted from the first clutch falls below a predetermined threshold; releasing the synchronous engagement between the support gear and the first input shaft; synchronously engaging an acceleration gear to the first input shaft, the acceleration gear having a gear ratio larger than that of the start gear by one speed; and then connecting the second clutch to the second input shaft.

According to this method, at the time of transmitting the torque through both clutches at the moment of start, the difference between the rotational speed inputted to the clutch on the support gear side (the rotational speed of the crankshaft) and the rotational speed outputted from the clutch on the support gear side reaches a coinciding point earlier than that of the clutch on the start gear side. For this reason, when the value of the rotational speed difference falls below a set value which is the predetermined threshold, the clutch on the support gear side is fully disconnected from the partially connected state, and the transmission of the rotation is performed only with the start gear. In this way, it is possible to prevent the clutch on the support gear side from slipping and being worn unnecessarily. Moreover, since the acceleration gear that comes next to the start gear is synchronously engaged in advance, smooth acceleration can be achieved.

A dual clutch transmission for achieving the above-described object is a dual clutch transmission which includes at least a first input shaft configured to be connected to a first clutch and a second input shaft configured to be connected to a second clutch, and in which a set of odd-numbered gears and a set of even-numbered gears are arranged every one step for alternation respectively between the first and the second input shafts and an output shaft, and in a case of starting transmission of power from a power source to the output shaft, the transmission of the power is started by synchronously engaging a start gear being one of the gears for start to the second input shaft and connecting the second clutch to the second input shaft, and including a support gear and a control device, the support gear having a gear ratio smaller than that of the start gear by one speed or higher, and the control device includes a control of, at the time of starting the transmission of the power from the power source to the output shaft, synchronously engaging the start gear to the second input shaft and the support gear to the first input shaft, respectively, and a control of simultaneously connecting the first clutch partially to the first input shaft and the second clutch partially to the second input shaft, respectively.

Moreover, the above-described dual clutch transmission further includes an acceleration gear having a gear ratio larger than that of the start gear by one speed, an input-rotational-speed sensor configured to detect a rotational speed inputted to the first clutch, and an output-rotational-speed sensor configured to detect a rotational speed outputted from the first clutch, and the control device further includes a control of determining whether or not the value of a difference between the rotational speed inputted to the first clutch and the rotational speed outputted from the first clutch falls below a predetermined threshold, a control of disconnecting the first clutch from the first input shaft when the value of the difference between the rotational speeds falls below the threshold, a control of releasing the synchronous engagement between the support gear and the first input shaft and synchronously engaging the acceleration gear to the input shaft, and a control of connecting the second clutch to the second input shaft.

Moreover, the above-described dual clutch transmission further comprises an acceleration gear having a gear ratio larger than that of the start gear by one speed, an input-rotational-speed sensor configured to detect a rotational speed inputted to the first clutch, and an output-rotational-speed sensor configured to detect rotational speed outputted from the first clutch, and the control device further includes a control of determining whether or not the value of a difference between the rotational speed inputted to the first clutch and the rotational speed outputted from the first clutch falls below a predetermined threshold, a control of disconnecting the first clutch from the first input shaft when the value of the difference between the rotational speeds falls below the threshold, a control of releasing the synchronous engagement between the support gear and the first input shaft and synchronously engaging the acceleration gear to the input shaft, and a control of connecting the second clutch to the second input shaft.

According to these configurations, the same operation and effect as those described above can be achieved without adding any component to a conventional dual clutch transmission. Thus, the cost can be reduced.

A vehicle for achieving the above-described object is equipped with the above-described dual clutch transmission. According to this configuration, the wear of the clutches can be made even, and the feel during start does not change. Thus, a vehicle with good driving comfort can be provided.

Effect of the Invention

According to the present invention, it is possible to reduce the load on one of the clutches to suppress the occurrence of wear of only the one clutch and therefore make the clutch replacement interval longer, without requiring any additional component and also without changing the feel during start.

DESCRIPTION OF THE EMBODIMENTS

Figure 5:
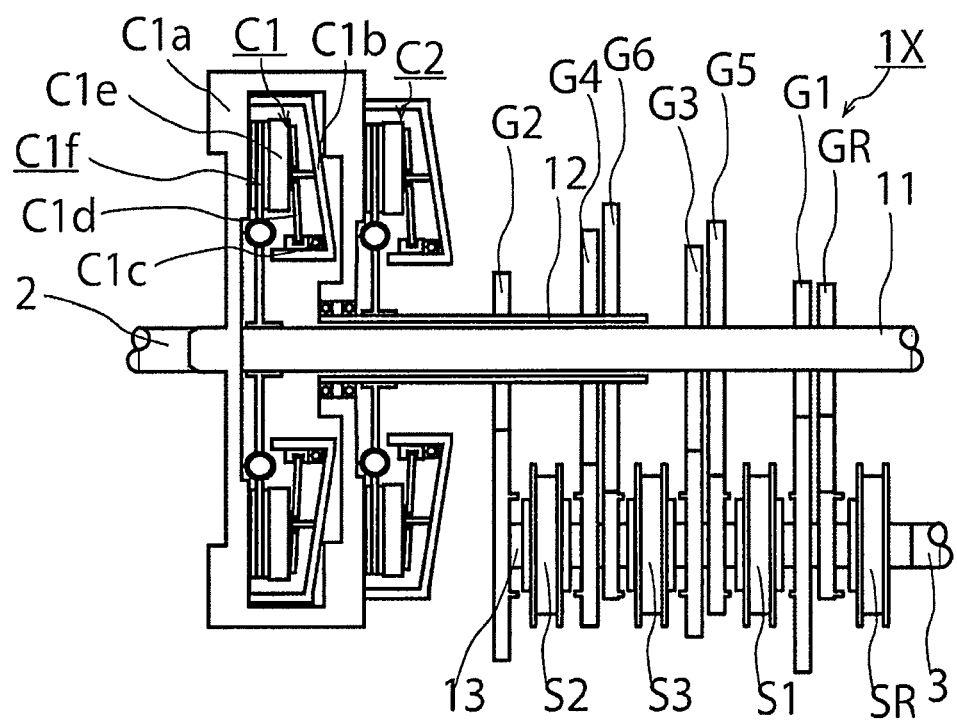
FIG. 5 is a diagram showing a conventional dual clutch transmission.

Hereinbelow, a method of controlling a dual clutch transmission, a dual clutch transmission, and a vehicle equipped with the same embodiments according to the present invention will be described with reference to the drawings. Note that the same components and operations as those of the conventional dual clutch transmission (DCT) 1X shown in FIGS. 5 and 6 will be denoted by the same reference numerals, and description thereof will be omitted. Moreover, while the embodiments according to the present invention will be illustrated by using a six-speed DCT, the number of gears is not limited and the DCT of the present invention may be an eight-speed DCT, for example.

Figure 1:
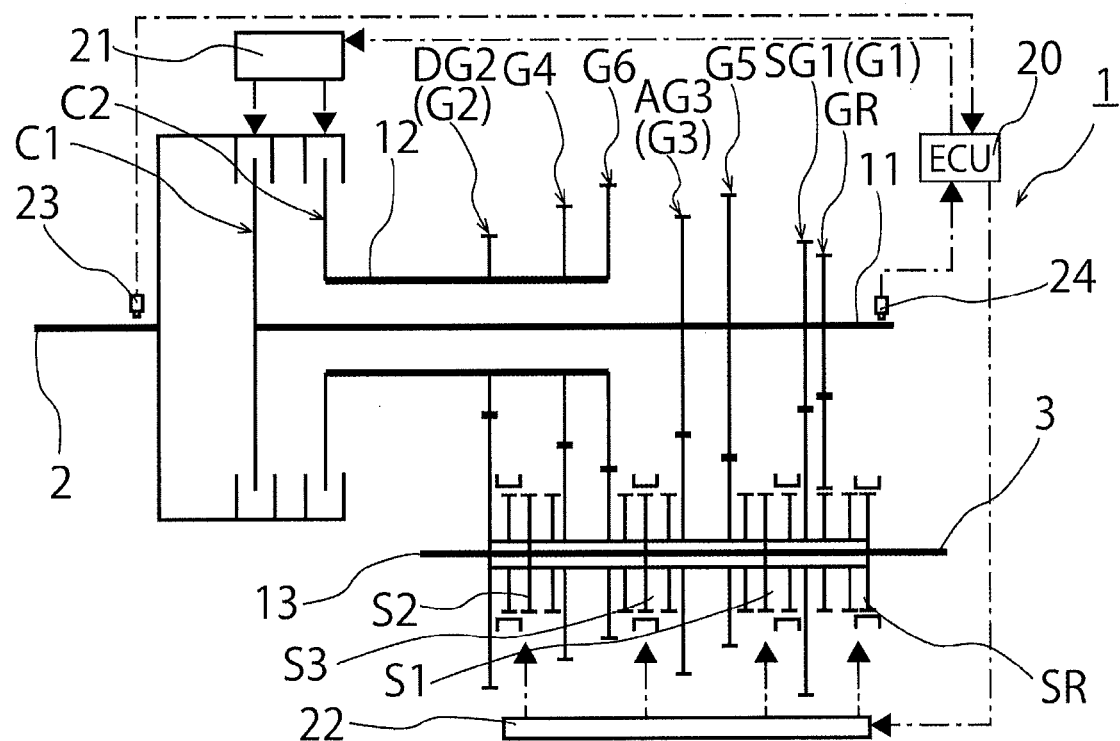
FIG. 1 is a schematic diagram showing a dual clutch transmission of an embodiment according to the present invention.
Figure 6:
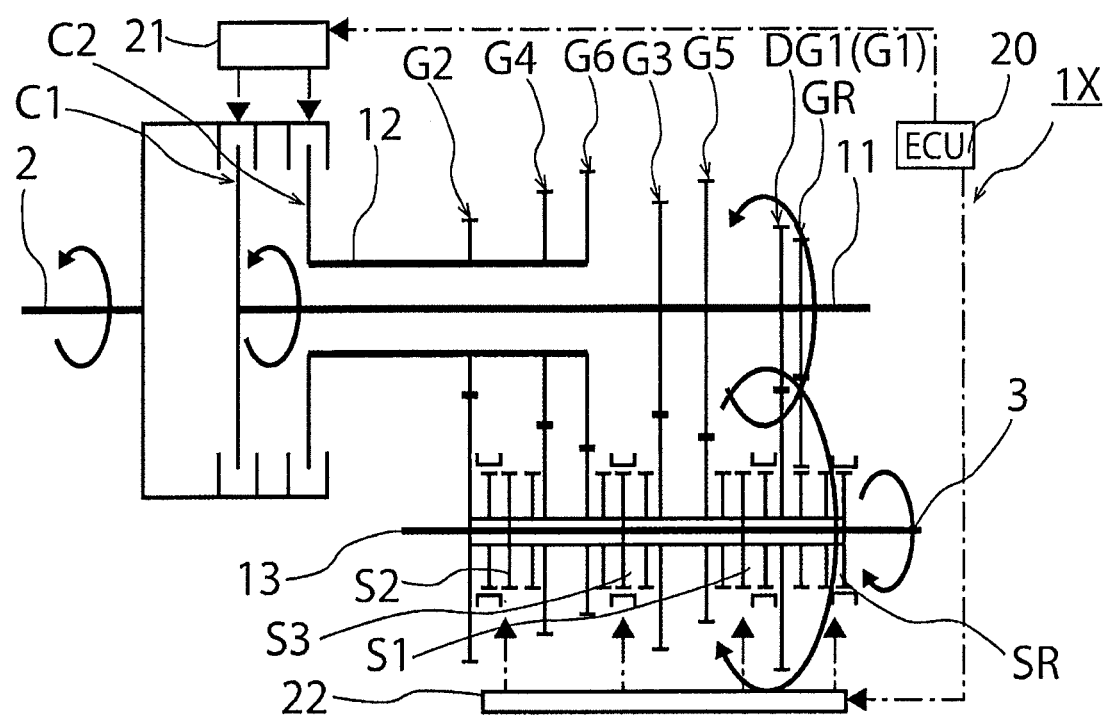
FIG. 6 is a schematic diagram showing the conventional dual clutch transmission.

As shown in FIG. 1, a dual clutch transmission (hereinafter, referred to as the DCT) 1 of the embodiment according to the present invention, includes a first input shaft 11, a second input shaft 12, a first clutch C1, a second clutch C2, a countershaft 13, gears G1 to G6, a gear GR, coupling sleeves S1 to S3, a coupling sleeve SR, an ECU (control device) 20, a clutch operation mechanism 21, and a synchronous engagement mechanism 22, and uses a configuration similar to that of the conventional DCT X1 shown in FIG. 6. However, as shown in FIG. 1, the configuration is different from that of the conventional DCT X1 in that: the gear G2, the gear G1, and the gear G3 serve as a start gear DG2, a support gear SG1, and an acceleration gear AG3, respectively; the clutch operation mechanism 21 is configured to be capable of simultaneously operating both clutches C1 and C2; and a first-clutch input-rotational-speed sensor 23 and a first-clutch output-rotational-speed sensor 24 are added.

This DCT 1 is not limited to the above configuration as long as it is an automated manual transmission, and no limitation is imposed on the arrangement of both input shafts, the numbers of the input shafts and the clutches mounted, the number of the gears, and so on. For example, it is possible to employ a configuration in which both input shafts are disposed not coaxially but in parallel with each other with the countershaft disposed between the input shafts. Moreover, the present invention may be applied to a triple clutch transmission including three clutches. Thus, as long as the DCT is a conventional one, no additional component needs to be particularly added. Accordingly, the cost can be reduced.

In the above configuration, the gear G2 is the start gear DG2, and the gear G1 which synchronously engages with the first input shaft 11 at a gear ratio lower than the start gear DG2 by one speed is the support gear SG1. Moreover, the gear G3 which synchronously engages with the first input shaft 11 at a gear ratio higher than the start gear DG2 by one speed is the acceleration gear AG3. This start gear may be set to any gear as long as it is the gear G2 (second speed) or higher. Moreover, the support gear only needs to have a gear ratio lower than the start gear by one speed or higher and synchronously engages with the input shaft other than that for the start gear. For example, when the gear G3 is the start gear, the gear G2 and the gear G4 are set as the support gear and the acceleration gear, respectively.

The ECU 20 is a control device called an engine control unit and configured to control the whole power plant including the transmission through electric circuits. The ECU 20 also controls the engine and is a microcontroller which performs total electrical control. In the case of an automatic transmission vehicle, the ECU 20 stores therein optimal control values for all the possible traveling states, and controls the mechanisms by causing sensors to detect the current state and selecting the optimal values from the stored data based input signals from the sensors.

This ECU 20 controls the connection of the first clutch C1 to the first input shaft 11 and the connection of the second clutch C2 to the second input shaft 12 independently and simultaneously. Moreover, the ECU 20 can also control each of the first clutch C1 and the second clutch C2 to bring them into a half clutch (partially connected) state. The half clutch state refers to a state where the clutch is not fully engaged. In this state, the drive power from the engine can be adjusted and transmitted to power transmission systems such as the transmission, transfer case, and differential gear. Thus, the drive power can be transmitted to the wheel(s) even during a low-speed traveling state where the traveling speed of the vehicle does not match the engine speed or during a stopped state.

In addition, the ECU 20 also performs control which brings the gears G1 to GR into synchronous engagement with the first input shaft 11 and the second input shaft 12 through the coupling sleeves S1 to SR. This control can bring the odd-numbered gear G1, G3, or G5 into synchronous engagement while the even-numbered gear G2, G4, or G6 is being used, for example, so as to achieve a smooth gear shift operation.

The clutch operation mechanism 21 only needs to be capable of operating the clutches C1 and C2 to connect them to the first input shaft 11 and the second input shaft 12, respectively, and operating the clutches C1 and C2 simultaneously. The clutch operation mechanism 21 is formed of a hydraulic piston, an electromagnetic actuator, and the like, for example. The shift operation mechanism 22 includes shift forks which swing the coupling sleeves S1 to SR, and only needs to be capable of operating these shift forks. The shift operation mechanism 22 is formed of a hydraulic piston, an electromagnetic actuator, and the like, for example. The clutch operation mechanism 21 and the shift operation mechanism 22 are not limited to the configurations described above; the clutch operation mechanism 21 only needs to be capable of operating the clutches C1 and C2, and the shift operation mechanism 22 only needs to be capable of operating the coupling sleeve S3.

The first-clutch input-rotational-speed sensor 23 is a sensor capable of detecting an input rotational speed Nin of the first clutch C1, and the first-clutch output-rotational-speed sensor 24 is a sensor capable of detecting an output rotational speed Nout of the first clutch C1. The input rotational speed Nin is the rotational speed of the crankshaft 2, and an existing crank angle sensor can be used. Moreover, the output rotational speed Nout is the rotational speed of the first input shaft 11 which is lower than the input rotational speed Nin due to the presence of the first clutch C1, and an existing speed sensor or the like can be used. Considering the gear ratio of the support gear G1, this first-clutch output-rotational-speed sensor 24 can be provided to the output shaft 3 instead of being provided to the first input shaft 11.

Figure 2:
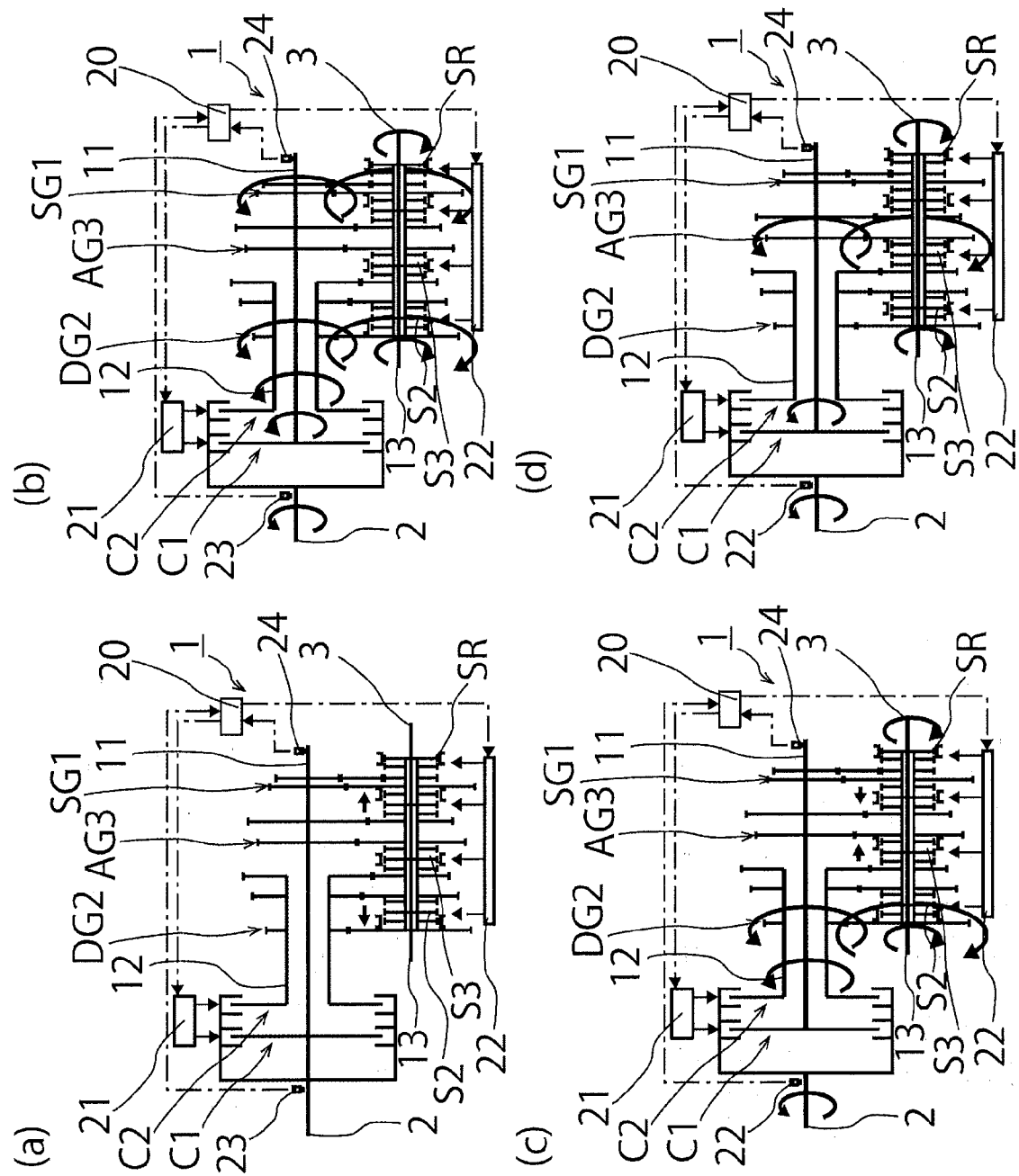
FIG. 2 is a start operation of the dual clutch transmission of the embodiment according to the present invention. Part (a) is a diagram showing a state before start, Part (b) is a diagram showing a state at the moment of the start, Part (c) is a diagram showing a state where a rotational speed difference falls below a set value and a clutch on a support gear side is fully disconnected, and Part (d) is a diagram showing a state during acceleration.

Next, the operation of the DCT 1 will be described with reference to FIG. 2. As shown in Part (a) of FIG. 2, before the vehicle starts or when the vehicle starts, the ECU 20 synchronously engages the start gear DG2 and the support gear SG1 to the second input shaft 12 and the first input shaft 11, respectively. Then, as shown in Part (b) of FIG. 2, when the vehicle starts, the ECU 20 simultaneously brings the first clutch C1 and the second clutch C2 into a half clutch state with respect to the first input shaft 11 and the second input shaft 12, respectively. In this way, both clutches C1 and C2 transmit the torque at the moment of the start. Thus, in addition to the second clutch C2 on the start gear DG2 side, the first clutch C1 on the support gear SG1 side takes part of the torque transmission.

Then, the input rotational speed Nin and the output rotational speed Nout detected by the first-clutch input-rotational-speed sensor 23 and the first-clutch output-rotational-speed sensor 24 are sent to the ECU 20, and the ECU 20 calculates a rotational speed difference ΔN therebetween (Nin−Nout). When this rotational speed difference ΔN falls below a set value Nlim which is a predetermined value, the ECU 20 fully disconnects the first clutch C1 on the support gear SG1 side in the half clutch state from the first input shaft 11 as shown in Part (c) of FIG. 2. As soon as the first clutch C1 is fully disconnected, the ECU 20 releases the synchronous engagement of the support gear SG1 and brings the acceleration gear AG3 into a synchronously engaged state. Note that while this operation is performed, the torque transmission is still being performed on the start gear DG2 side and therefore the acceleration of the vehicle is still continuing.

Once the acceleration gear AG3 is synchronously engaged, the ECU 20 fully connects the second clutch C2 on the start gear DG2 side to the second input shaft 12. If the speed is to be accelerated, the ECU 20 fully disconnects the second clutch C2 on the start gear DG2 side from the second input shaft 12 and fully connects the first clutch C1 on the acceleration gear AG3 side to the first input shaft 11.

Since this operation uses both clutches C1 and C2 during start, the wear of the second clutch C2 on the start gear DG2 side can be reduced. Accordingly, the replacement interval for both clutches C1 and C2 can be made longer.

Meanwhile, with the start gear DG2 and the support gear SG1 differing from each other in gear ratio, fully connecting both clutches C1 and C2 linked to these gears may result in double engagement and stop the operation. However, during start, the clutches C1 and C2 linked to the gears are in a half clutch state, hence absorbing the rotational speed difference. Thus, the double engagement can be prevented. Accordingly, both clutches C1 and C2 can be used simultaneously. In addition, since the input-output rotational speed difference ΔN reaches a coinciding point earlier for the first clutch C1 on the support gear SG1 side, the first clutch C1 is fully disconnected when that rotational speed difference ΔN falls below the set value Nlim. In this way, it is possible to prevent the first clutch from slipping and being worn unnecessarily.

Further, if the speed is to be accelerated, the second clutch C2 is fully connected after synchronously engaging, to the first input shaft 11, the acceleration gear AG3 which has a gear ratio higher than the start gear DG2 by one speed. In this way, the acceleration can be done smoothly by simply switching the clutches C1 and C2.

Figure 3:
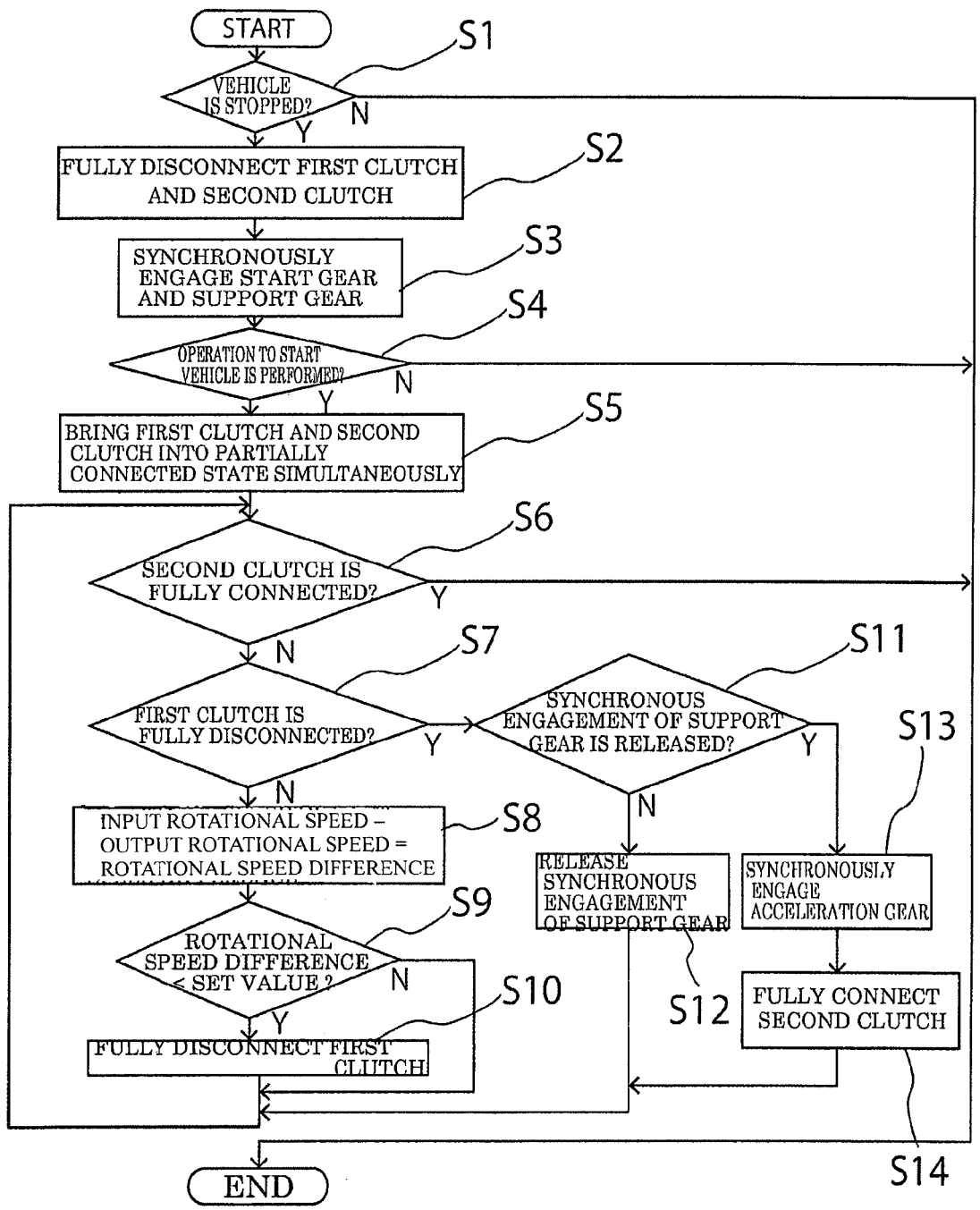
FIG. 3 is a flowchart showing a method of controlling the dual clutch transmission according to an embodiment of the present invention.

Next, a method of controlling the DCT 1 will be described with reference FIG. 3. First, the ECU 20 performs step S1 of determining whether or not the vehicle is stopped. If determining that the vehicle is stopped, the ECU 20 then performs step S2 of fully disconnecting the first clutch C1 from the first input shaft 11 or the second clutch C2 from the second input shaft 12. Then, the ECU 20 performs step S3 of synchronously engaging the start gear DG2 and the support gear SG1 to the second input shaft 12 or the first input shaft 11. In step S3, the ECU 20 synchronously engages the start gear DG2 and the support gear SG1 by operating the shift operation mechanism 22 to swing the coupling sleeve S2 and the coupling sleeve S1.

Then, the ECU 20 performs step S4 of determining whether or not an operation to start the vehicle is performed. If determining that an operation to start the vehicle is performed, the ECU 20 then performs step S5 of connecting the first clutch C1 and the second clutch C2 to the first input shaft 11 and the second input shaft 12 in a half clutch state, respectively. By step S5, the power from the crankshaft 2 can be transmitted to both clutches C1 and C2 and to the output shaft 3 at the moment of the start of the vehicle.

Then, the ECU 20 performs step S6 of determining whether or not the second clutch C2 is fully connected to the second input shaft 12. Since the second clutch C2 has been set to a half clutch state in step S5, the ECU 20 performs next step S7 of determining whether or not the first clutch C1 is fully disconnected from the first input shaft 11. Since the first clutch C1 has likewise been set to a half clutch state in step S5, the ECU 20 proceeds to the next step S8.

Then, the ECU 20 performs step S8 of calculating the rotational speed difference ΔN between the input rotational speed Nin and the output rotational speed Nout of the first clutch C1. Then, the ECU 20 performs step S9 of determining whether or not the rotational speed difference ΔN is smaller than the set value Nlim which is a predetermined threshold. Since the gear ratio of the support gear SG1 is smaller than that of the start gear DG2, the rotational speed difference ΔN reaches the coinciding point earlier than the other. If the value of the rotational speed difference ΔN reaches 0, i.e. the coinciding point, the first clutch C1 starts to slip and gets worn unnecessarily. In this respect, the set value Nlim is set preferably to such a value that "set value Nlim=rotational speed difference ΔN>0." In the case where the rotational speed difference ΔN is equal to or greater than the set value Nlim in step S9, the ECU 20 returns to step S6 and performs steps S6 to S9 again.

Then, if determining that the rotational speed difference ΔN is smaller than the set value Nlim, the ECU 20 performs step S10 of fully disconnecting the first clutch C1 from the first input shaft 11. Once completing step S10, the ECU 20 then returns to step S6. At this point, the first clutch C1 is fully disconnected, the second clutch C2 is in a half clutch state, the start gear DG2 is synchronously engaged, and the support gear SG1 is synchronously engaged.

Thus, it is "N" in step S6, and the ECU 20 proceeds to step S7. If determining in step S7 that the first clutch C1 is fully disconnected, the ECU 20 then performs step S11 of determining whether or not the synchronous engagement of the support gear SG1 is released. Since the synchronous engagement of the support gear SG1 is not released, the ECU 20 performs next step S12 of releasing the synchronous engagement of the support gear SG1. Once completing step S12, the ECU 20 returns to step S6. At this point, the first clutch C1 is fully disconnected, the second clutch C2 is in a half clutch state, the start gear DG2 is synchronously engaged, and the support gear SG1 is released from its synchronous engagement.

Then, through steps S6, S7, and S11, determining that the synchronous engagement of the support gear SG1 is released, the ECU 20 then performs step S13 of bringing the acceleration gear AG3 into a synchronously engaged state. Once completing step S13, the ECU 20 performs step S14 of fully connecting the second clutch C2 to the second input shaft 12. Once completing step S14, the ECU 20 returns to step S6. At this point, the first clutch C1 is fully disconnected, the second clutch C2 is fully connected, the start gear DG2 is synchronously engaged, the support gear SG1 is released from its synchronous engagement, and the acceleration gear AG3 is synchronously engaged.

This control method ends when the second clutch C2 is determined as being fully disconnected in step S6.

According to this method, the load on the second clutch C2 on the start gear DG2 side is reduced since both clutches C1 and C2 are used for start. Thus, the wear of the second clutch C2 can be reduced. Accordingly, the replacement interval for both clutches C1 and C2 can be made longer. Moreover, the above-described operation and effect can be achieved as long as both clutches C1 and C2 can be operated independently and simultaneously. Thus, no additional component is needed for a conventional DCT. Accordingly, the cost can be reduced. In addition, since the start gear DG2 is always the same gear each time start is performed, the wear of both clutches C1 and C2 can be reduced without changing the feel during start.

Further, by bringing both clutches C1 and C2 into a half clutch state, it is possible to solve the problem of double engagement which would otherwise occur due to the use of both clutches C1 and C2 for reducing the wear. This is because each clutch in the half clutch state absorbs the rotational speed difference. The other problem of slip of one of the clutches can be solved by determining whether or not the rotational speed difference ΔN of the support gear SG1 is smaller than the set value Nlim, which is a predetermined threshold, and using the time when the rotational speed difference ΔN is determined smaller as the timing to fully disconnect the first clutch C1 on the support gear SG1 side.

Figure 4:
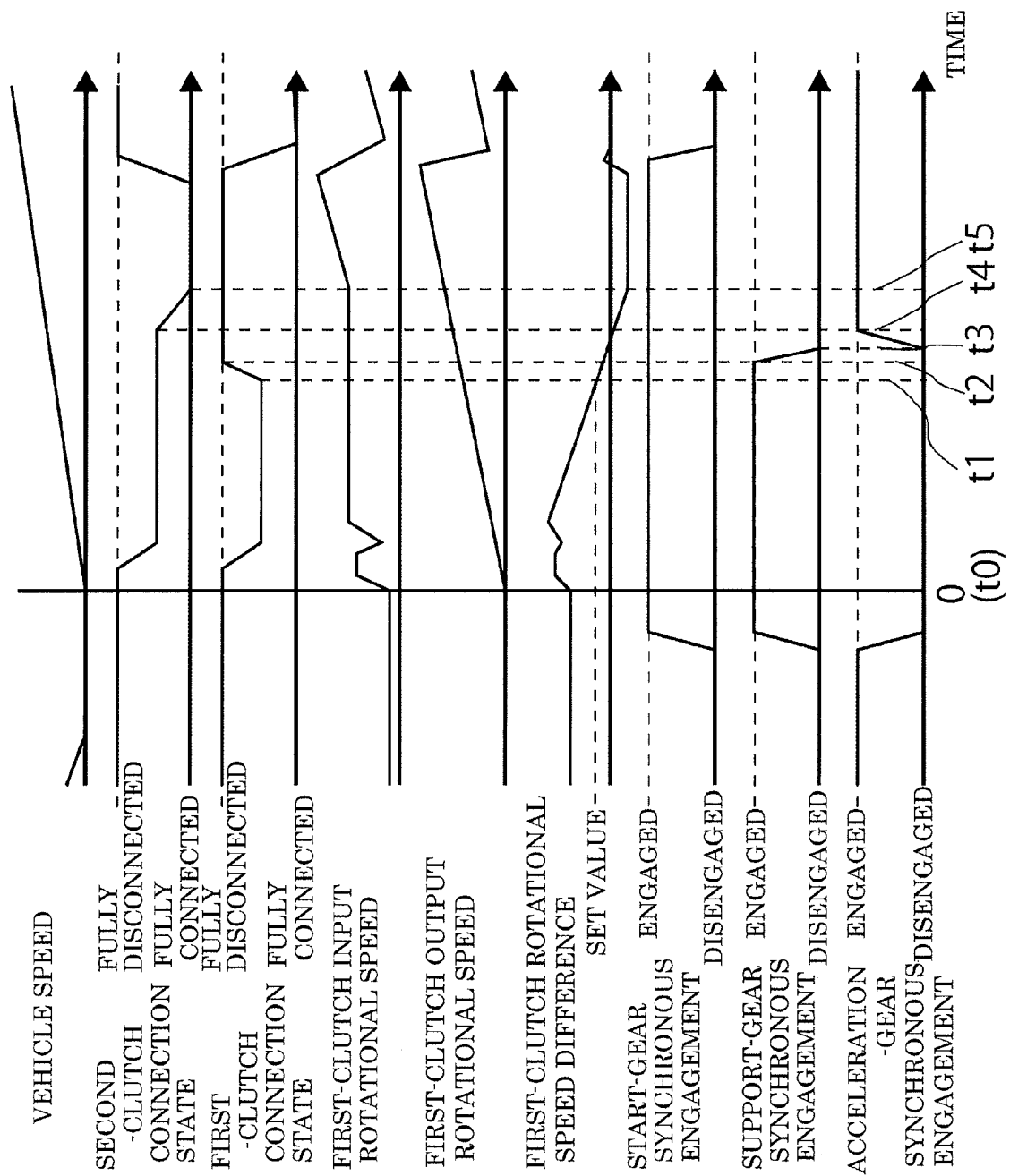
FIG. 4 is a diagram showing the operation of each part of the dual clutch transmission of an embodiment according to the present invention.

Next, how each part operates in the above control method will be described with reference to FIG. 4. It is assumed that: time t0 is time at which a start operation is performed; time t1 is time at which the rotational speed difference falls below the set value; time t2 is time at which the first clutch C1 is fully disconnected; time t3 is time at which synchronous engagement of the support gear SG1 is released; time t4 is time at which synchronously engaging of the acceleration gear AG3 is completed; and time t5 is time at which the second clutch is fully connected.

At the time t0, a start operation is performed. In response to determining that start operation, the first clutch C1 and the second clutch C2 are brought into a half clutch state. Thus, at the moment of the start of the vehicle, the torque can be transmitted through both clutches C1 and C2. The input rotational speed Nin of the support gear SG1 becomes constant after a short period of time, while the output rotational speed Nout keeps increasing gradually, thereby decreasing the rotational speed difference ΔN gradually. At the time t1, the rotational speed difference ΔN falls below the set value Nlim, and the first clutch C1 on the support gear SG1 side starts to be fully disconnected.

At the time t2, synchronous engagement of the support gear SG1 starts to be released. Then, at the time t3, the acceleration gear AG3 starts to be synchronously engaged. At the time t4 at which the synchronously engaging of the acceleration gear AG3 is completed, the start gear G2 starts to be fully connected from the half clutch state. At the time t5, the fully connecting of the second clutch C2 on the start gear DG2 side is completed.

As can be seen from the above operations, by applying the control method of the present invention to a conventional DCT, it is possible to reduce the load on the second clutch C2 on the start gear DG2 side and therefore reduce the wear thereof without causing double engagement or slip of one of the clutches.

A vehicle equipped with the above-described DCT 1 can make the wear of both clutches C1 and C2 even and therefore make the replacement interval for both clutches C1 and C2 longer than conventional cases. Moreover, the above-described operation and effect can be achieved without changing the feel during start, and therefore a vehicle with good driving comfort can be provided.

The method of controlling a dual clutch transmission of the present invention can reduce the load on the clutch on the start gear side and thus reduce the wear thereof and therefore make the clutch replacement interval longer, without requiring any additional component and also without changing the feel during start. Accordingly, the method of controlling a dual clutch transmission of the present invention can be utilized in large-sized vehicles such as trucks equipped with a dual clutch transmission to achieve low fuel consumption via smooth gear shift operations.

The invention claimed is:

1. A method of controlling a dual clutch transmission including a first input shaft to be connected to a first clutch, a second input shaft to be connected to a second clutch, a set of odd-numbered gears arranged on the second input shaft, a set of even-numbered gears arranged on the first input shaft, and an output shaft, the method comprising:

providing, as a start gear, one gear from the set of odd-numbered gears or the set of even-numbered gears;

providing, as a support gear, another gear of the other of the set of odd-numbered gears or the set of even numbered gears;

synchronously engaging the start gear to the second input shaft;

connecting the second clutch to the second input shaft;

starting transmission of power from a power source to the output shaft by synchronously engaging the start gear to the second input shaft and synchronously engaging the support gear to the first input shaft, respectively, and simultaneously connecting the first clutch partially to the first input shaft, and connecting the second clutch partially to the second input shaft, respectively, the support gear having a gear ratio smaller than that of the start gear by one speed or higher;

disconnecting the first clutch from the first input shaft, when a difference between a detected rotational speed inputted to the first clutch and a detected rotational speed outputted from the first clutch falls below a predetermined threshold, while keeping the second clutch partially connected;

then, releasing the synchronous engagement between the support gear and the first input shaft;

synchronously engaging an acceleration gear to the first input shaft, the acceleration gear having a gear ratio larger than that of the start gear by one speed; and then fully connecting the second clutch to the second input shaft.

2. A dual clutch transmission including a first input shaft to be connected to a first clutch, a second input shaft to be connected to a second clutch, a set of odd-numbered gears arranged on the second input shaft, a set of even-numbered gears arranged on the first input shaft, and an output shaft, the transmission comprising:

a start gear which is one gear from one of the set of odd-numbered gears or the set of even-numbered gears;

a support gear which is one gear of the other of the set of odd-numbered gears or the set of even numbered gears, the support gear having a gear ratio small than that of the start gear by one speed or higher, an acceleration gear having a gear ratio larger than that of the start gear by one speed;

an input-rotational-speed sensor to detect a rotational speed inputted to the first clutch;

an output-rotational-speed sensor to detect a rotational speed outputted from the first clutch; and a control device configured to start a transmission of power from a power source to the output shaft by synchronously engaging the start gear to the second input shaft and synchronously engaging the support gear to the first input shaft, respectively, and simultaneously connecting the first clutch partially to the first input shaft and the second clutch partially to the second input shaft, respectively;

determine whether or not a value of a difference between the detected rotational speed inputted to the first clutch and the detected rotational speed outputted from the first clutch falls below a predetermined threshold;

disconnect the first clutch from the first input shaft, when the value falls below the threshold, while keeping the second clutch partially connected;

release the synchronous engagement between the support gear and the first input shaft, after disconnecting the first clutch, and synchronously engaging the acceleration gear to the first input shaft; and fully connect the second clutch to the second input shaft after the synchronously engaging of the acceleration gear to the first input shaft.

3. A vehicle equipped with the dual clutch transmission according to claim 2.

* * * * *